United States Patent
Melkild

(10) Patent No.: US 11,018,899 B1
(45) Date of Patent: May 25, 2021

(54) ONBOARDING A VNF WHICH INCLUDES A VDU WITH MULTIPLE VNFCS

(71) Applicant: OPEN INVENTION NETWORK LLC, Durham, NC (US)

(72) Inventor: Keith William Melkild, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 16/727,865

(22) Filed: Dec. 26, 2019

Related U.S. Application Data

(60) Provisional application No. 62/784,983, filed on Dec. 26, 2018.

(51) Int. Cl.
*G06F 15/173* (2006.01)
*H04L 12/46* (2006.01)
*G06F 9/455* (2018.01)

(52) U.S. Cl.
CPC ...... *H04L 12/4641* (2013.01); *G06F 9/45558* (2013.01); *G06F 2009/45595* (2013.01)

(58) Field of Classification Search
CPC ............ H04L 12/4641; G06F 9/45558; G06F 2009/45595
See application file for complete search history.

(56) References Cited

U.S. PATENT DOCUMENTS

| | | | | |
|---|---|---|---|---|
| 10,693,817 | B1* | 6/2020 | Melkild | G06F 9/45558 |
| 2017/0006083 | A1* | 1/2017 | McDonnell | H04L 67/1097 |
| 2019/0036869 | A1* | 1/2019 | Jana | G06F 9/45558 |
| 2019/0281077 | A1* | 9/2019 | Deb | G06F 9/45558 |
| 2020/0201874 | A1* | 6/2020 | Reehil | G06F 9/45529 |
| 2020/0259719 | A1* | 8/2020 | Ni | H04L 41/20 |

OTHER PUBLICATIONS

Fax sent to Applicant on Aug. 10, 2020. (Year: 2020).*
Makaya et al.- "Automated Virtual Network Functions Onboarding", published by IEEE in 2016, 6 pages (Year: 2016).*

* cited by examiner

*Primary Examiner* — Richard G Keehn

(57) ABSTRACT

The instant solution includes at least one element or action described or depicted herein.

17 Claims, 8 Drawing Sheets

FIG 5

```
502 ——— !--- VNF.yaml (VNFD)                                              500
504 ——— !--- VNF.mf (manifest)
506 ——— !--- VNF.cert (signing certificate)
508 ——— !--- ChangeLog.txt
510 ——— !--- Licenses
512 ———         !--- file(s)
514 ——— !--- Artifacts
516 ———         !---- scripts
518 ———              !--- file(s)
520 ———         !---- vdus
522 ———              !---- vduX
524 ———                   !---- vcImage
526 ———                        !--- file(s)
528 ———                   !--- scripts
530 ———                        !--- file(s)
532 ———                   !---- vnfc
534 ———                        !---- vnfcY
536 ———                             !--- scripts
538 ———                                  !--- file(s)
540 ———                             !--- swLoad
542 ———                                  !--- file(s)
```

ONBOARDING A VNF WHICH INCLUDES A VDU WITH MULTIPLE VNFCS

TECHNICAL FIELD

This application generally relates to onboarding of Virtual Network Functions (VNFs) in a system employing a Network Function Virtualization (NFV) architecture. More specifically, the application relates to onboarding a VNF which includes multiple Virtual Network Function Components (VNFCs) in a single Virtual Deployment Unit (VDU).

BACKGROUND

Network Function Virtualization (NFV) based architectures offer a way to design and deploy telecommunication network services. In the past, the functions that make up these services have been tightly coupled to the proprietary hardware on which they execute. NFV based architectures decouple the software implementation of these functions from the underlying infrastructure. The software typically runs in virtual machines or containers, under the control of a hypervisor or operating system which run on commercial off-the-shelf (COTS) servers. This approach has the promise of significant reductions in capital and operational expenses for service providers as custom hardware is no longer required and scaling is provided through additional software deployments, not a provisioning of new physical equipment.

The European Telecommunications Standard Institute (ETSI) network functions virtualization (NFV) industry specification group (ISG) has defined a reference NFV architecture. ETSI took an approach that enables existing management infrastructure such as Operational Support Systems (OSS)/Business Support Systems (BSS) and Element Management Systems (EMS) to remain in place. The standard is focused on getting Network Services (NSs) and Virtual Network Functions (VNFs) deployed on a cloud based infrastructure, while leaving traditional Fault, Configuration, Accounting, Performance and Security (FCAPS) to be managed by EMS and OSS/BSS.

The Open Network Automation Platform (ONAP) Linux Foundation Project presents a competing, though related architecture. This architecture is in many ways a superset of the ETSI NFV architecture as it offers a complete system wide solution including VNF package creation and management, user management, service management, and VNF deployment into various cloud platforms. Complete VNF management, including traditional FCAPS, removes the reliance on EMSs, though integration with existing OSS/BSSs is still supported.

SUMMARY

In an NFV architected system, functions that were tied to specialized hardware in the past are decoupled so that their software implementations can be executed in virtualized containers running on COTS hardware. These decupled software implementations are called Virtual Network Functions (VNFs). Each of these functions is made up of one or more software components which are known as VNF Components (VNFCs). In the current architectural standards, VNFCs are mapped one to one with a virtual machine/container. A description of this mapping, which describes the VNFC software, operating system, etc. that will be deployed together, is known as a Virtual Deployment Unit (VDU). The rationale for limiting a VDU to a single VNFC is that the hosting VM or container provides limits to the underlying resources that the VNFC can consume. One downside to this approach however is the resource overhead required for each VM/container. This can be very problematic when trying to deploy a VNF onto a hardware platform with minimal resources. Another downside is the number of VMs/containers that have to be managed. Given this, there exists a need to onboard a VNF which includes a VDU that contains multiple VNFCs.

BRIEF DESCRIPTION OF DRAWINGS

FIG. 5 is a diagram of an embodiment of a VNF package archive in accordance with one or more embodiments.

DETAILED DESCRIPTION

Figure 1:
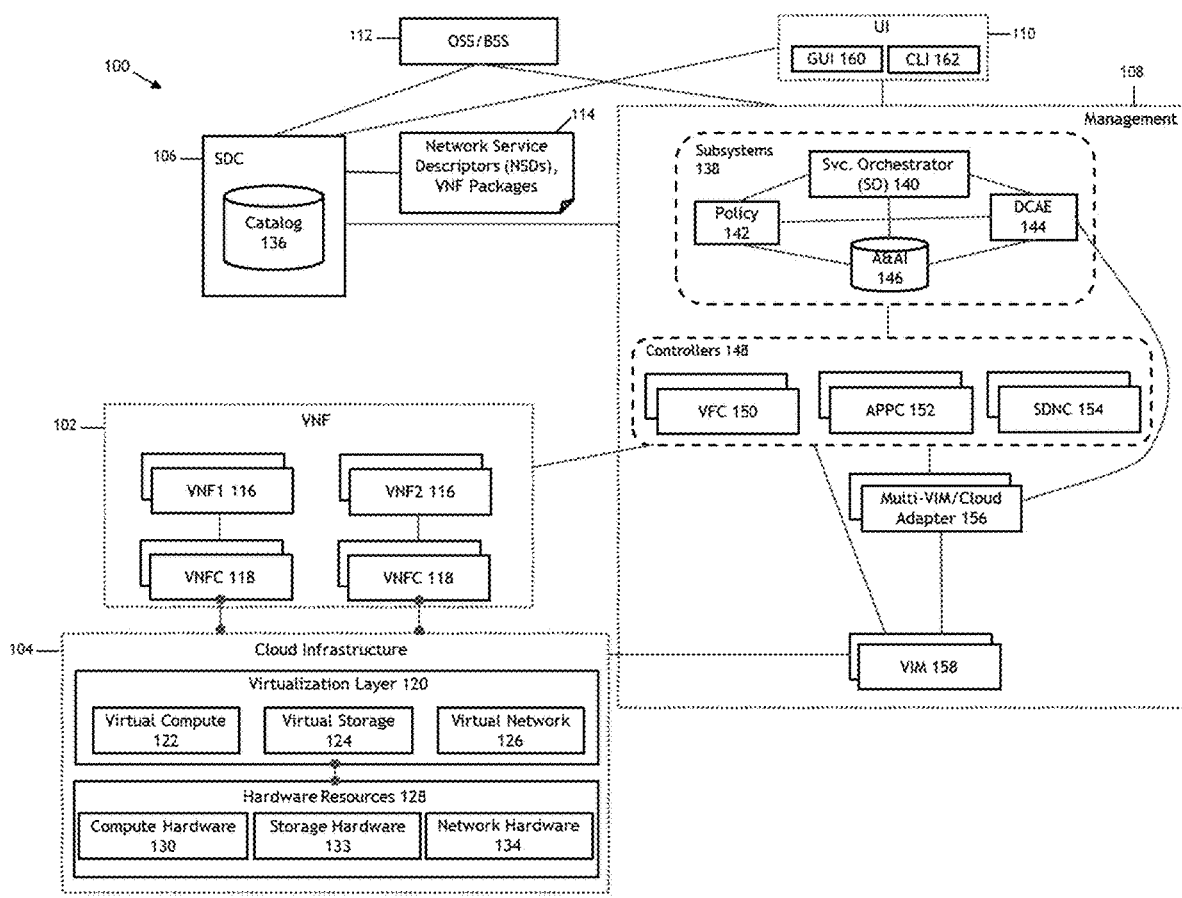
FIG. 1 is a diagram of an embodiment of a network function virtualization framework in accordance with one or more embodiments.

It will be readily understood that the instant components and/or steps, as generally described and illustrated in the figures herein, may be arranged and designed in a wide variety of different configurations. Thus, the following detailed description of the embodiments of at least one of a method, system, component and non-transitory computer readable medium, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed herein are various embodiments for implementing and/or utilizing lifecycle management of VNFC modules. A VNF is the implementation of a network function that can be deployed in an NFV architecture. VNFs can be viewed as service building blocks which may be used by one or more Network Services (NSs). Examples of VNFs include, but are not limited to, firewall, application acceleration, Deep Packet Inspection (DPI), Session Initiation Protocol (SIP) user agent, and Network Address Translation (NAT).

Each VNF specifies its deployment and operational behavior in a deployment template known as a VNF Descriptor (VNFD). This descriptor along with the VNF software bundle are delivered to an NFV management system in an archive known as a VNF Package. A VNF may be implemented using one or more VNF Components (VNFCs). A VNFC is an internal component of a VNF that provides a subset of that VNF's functionality. The main characteristic of a VNFC is that it maps n:1 with a Virtualized Container (VC) when the function is deployed. The term Virtualized Container (VC) is used herein to describe a Virtual Machine (VM) or operating system container. VNFCs are in turn made up of one or more software modules. Each module may spawn one or more operating system processes when deployed.

A VNF instance (VNFI) is a run-time instantiation of the VNF software resulting from completing the instantiation of its VNFCs and the connectivity between them. As multiple instances of a VNF can exist in the same domain, the terms VNF and VNF Instance (VNFI) may be used interchangeably herein. Similarly, VNFC instance (VNFCI) is a run-time instantiation of a VNFC deployed in a particular VC. It has a lifecycle dependency with its parent VNFI. As multiple instances of a VNFC can exist in the same domain, the terms VNFC and VNFC Instance (VNFCI) may also be used interchangeably herein.

FIG. 1 is a diagram of a network function virtualization framework 100 for implementing NFV in accordance with one or more embodiments of the present application. The NFV framework 100 comprises a VNF module 102, a cloud infrastructure module 104, a Service Design and Creation (SDC) module 106, a management module 108, a User Interface (UI) 110 module, and an optional operating support system (OSS)/business support system (BSS) module 112. A module may be a virtual element, a physical network element or embedded in a physical network element and may consist of hardware, software, firmware and/or a combination of one or more of hardware, software, and firmware.

In some embodiments, the VNF module 102 may comprise VNFs 116 and VNFCs 118. Each VNF 116 may be composed of one or more VNFCs 118. In one embodiment, the VNF module 102 may correspond with a network node in a system and may be free from hardware dependency. The cloud infrastructure module 104 is configured to provide virtual compute, storage and network resources to support the execution of the VNFs. The cloud infrastructure module 104 may comprise COTS hardware, accelerator components where necessary and/or a software layer which virtualizes and abstracts underlying hardware. For example, the infrastructure module 104 may comprise one or more of a virtual compute module 122, a virtual storage module 124, and a virtual networking module 126 within a virtualization layer 120. The virtualization layer 120 may be operably coupled to hardware resources 128 including, but not limited to compute hardware 130, storage hardware 132 and network hardware 134.

In accordance with one or more embodiments of the present application, the SDC module 106 provides an integrated development platform for designing and creating network services (NSs). This process is enabled with support of VNF onboarding and storage. VNFs are on-boarded as VNF packages 114 each of which includes, but is not limited to a VNF Descriptor (VNFD) and a VNF software bundle. The VNFD is a set of metadata that describes VNF to VNFC structure and underlying infrastructure requirements. Services are defined in Network Service Descriptors (NSDs) 114, each of which is a set of metadata that describe the relationship between services, VNFs and any underlying infrastructure requirements. The SDC module 106 provides APIs which are usable by other modules for querying VNF/service artifacts, uploading artifacts, and retrieving artifacts. Service and VNF artifacts are stored in a catalog 136. In some embodiments, this catalog is a database.

In some embodiments, the management module 108 is configured to enable orchestration, monitoring and lifecycle management of VNFs, the software defined networks (SDN) that contain them and higher level services that combine the above. Additionally, the management module 108 is configured to provide traditional FCAPS capabilities for the aforementioned VNFs, SDNs and services. The management module 108 operates on a set of service and VNF artifacts which are stored in and retrieved from the SDC module 106.

In accordance with one or more embodiments of the present application, the management module includes a set of subsystems 138 that comprises a Service Orchestrator (SO) subsystem 140, a Policy subsystem 142, a Data Collection, Analytics and Event subsystem 144 and an Active and Available Inventory subsystem 146. The subsystems work closely together to enable service orchestration, VNF monitoring and VNF lifecycle management.

In some embodiments, the SO subsystem 140 is configured for automated sequencing of activities, tasks, rules and policies needed for the creation, modification and removal of network applications, services, VNFs, Physical Network Functions (PNFs) and other resources. Further, specialized orchestrations scopes are supported. In some embodiments, these include, but are not limited to, NS and VNF scaling, homing and placement.

In accordance with one or more embodiments of the present application, the Policy subsystem 142 provides for the creation and management of modifiable configurations, rules assertions and/or conditions to provide real-time decision making on conditions and events that underlie the functions of the management module 108. Policy scopes may include, but are not limited to, infrastructure management, NSs, VNFs, operation automation, and security.

In some embodiments, the DCAE subsystem 144 enables closed loop control and correlation of business and operations activities. The module collects and publishes fault, performance, usage and configuration data in order to enable FCAPS functionality in the modules that comprise the management module 108. Further, it provides computation of analytics, and aids for trouble-shooting and management that are derived from the collected data.

In accordance with one or more embodiments of the present application, the A&AI subsystem 146 maintains a live view of services and resources in the NFV system 100, providing the state and relationships between them. Further it maintains a registry of external systems with which the NFV system 100 connects. An API that enables advanced search of the inventory data is provided and utilized by other management modules, including but not limited to the SO module 140, policy module 142 and DCAE module 144.

In accordance with one or more embodiments of the present application, the management module includes a set of controllers 148 that comprises a Virtual Function Controller (VFC) 150, an Application Controller (APPC) 152, and a Software Defined Networking Controller (SDNC) 154. The VFC 150 is an ETSI NFV architecture aligned VNF controller aimed at interworking with components built to the ETSI NFV standard. The APPC 152 is a VNF controller which manages OSI layer 4-7 services. The SDNC 154 is a VNF/Physical Network Function (PNF) controller which manages OSI layer 1-3 services.

In some embodiments, the Virtual Function Controller (VFC) 150 is an ETSI NFV Management and Orchestration (MANO) compliant provider of full LCM and FCAPS for NSs and VNFs. It consists of two main components, a resource orchestration component and a VNF management component. The resource orchestration component provides network service LCM along with FCAPS management for NSs and VNFs. ETSI compliant interfaces are provided for NS package management, VNF package management and VNF operation granting. The VFC 150 interworks with various management subsystems 138 to provide these capabilities. Further it utilizes a catalog synchronization interface provided by the SDC 106 to gain access to NS and VNF packages. The VNF management component is provided by a generic Virtual Network Function Manager (VNFM) as defined in the ETSI NFV architecture specification. It supports VNF lifecycle management directives which include, but are not limited to, deploy, scale, heal, start and stop from the VFC orchestration component. The generic VNFM within the VFC 150 may support multiple VNFs and multiple types of VNFs 116. It interworks with multiple Virtual Infrastructure Managers (VIMs) 158 directly or indirectly through a Multi-VIM/Cloud Adapter 156 in order to provide the aforementioned VNF LCM.

In accordance with one or more embodiments of the present application, the Application Controller (APPC) 152 supports VNF lifecycle management operations which include, but are not limited to, deploy, scale, heal, migrate, start and stop. The APPC 152 interworks with various management subsystems 138 to provide these management capabilities. Further, in some embodiments, the APPC 152 is directed by the SO 140 or the Policy subsystem 142. An APPC 152 may support multiple VNFs and multiple types of VNFs 116 as it is service and VNF agnostic. In some embodiments, the APPC 152 manages a VNF using standards based protocols such as NETCONF, or platform automation protocols such as Chef/Ansible. The APPC 152 interworks with multiple Virtual Infrastructure Managers (VIMs) 158 directly or indirectly through a Multi-VIM/Cloud Adapter 156 in order to provide the aforementioned VNF LCM.

In some embodiments, the Software Defined Networking Controller (SDNC) 154 configures and maintains the health of layer 1-3 VNFs/PNFs and network services throughout their lifecycle. The SDNC 154 interworks with various management subsystems 138 to provide these management capabilities. Further, in some embodiments, the SDNC 154 is directed by the SO 140, the Policy subsystem 142 or the DCAE subsystem 144. An SDNC 154 may support multiple VNFs/PNFs and multiple types of VNFs/PNFs. Further, it manages all inventory within its scope which is typically limited to a single service/network domain. As with APPCs 152, SDNCs 154 may interwork with multiple Virtual Infrastructure Managers (VIMs) 158 directly or indirectly through a Multi-VIM/Cloud Adapter 156 in order to manage VNFs/PNFs.

In accordance with one or more embodiments of the present application, the Multi-VIM/Cloud Adapter 156 enables deployment and execution of VNFs on multiple infrastructure environments which may vary by vendor, cloud type (public or private) and/or software distribution. The Adapter 156 effectively provides a cloud mediation layer which prevents vendor lock-in and decouples the evolution of the NFV management system 108 from the underlying cloud infrastructures 104.

In some embodiments, the VIM 158 is responsible for controlling and managing Cloud Infrastructure 104 compute, storage and network resources usually within an operator's infrastructure domain. Additionally, VIMs 158 may be partitioned based on an operator's Points of Presence (PoPs), i.e. physical locations. VIMs are typically coupled to the infrastructure management software with which they interwork. That software may vary by type of cloud (public/private), vendor (e.g. Amazon, Microsoft, etc.) and/or different distributions (e.g. standard OpenStack, Red Hat OpenStack, etc.).

In accordance with one or more embodiments of the present application, UI module 110 provides multiple User Interfaces (UIs) into the NFV management module 108. These UIs are enabled by APIs provided by the management subsystems 138, controllers 148 and other components within the management module 108. The UI module is comprised of a Graphical User Interface (GUI) 160 and a Command Line Interface (CLI) 162, the latter of which is often preferred by network operators. It is expected that the provided GUI and CLI interfaces serve as the primary human interfaces into NFV systems that do not include a pre-existing OSS/BSS module 112.

In some embodiments, a network provider may have an existing OSS/BSS module 112 that is configured to support management functions such as network inventory, service provisioning, networking configurations, and fault management. Further, the OSS/BSS module 112 may be configured to support end-to-end telecommunication services. In the embodiments that include an OSS/BSS module 112, the OSS/BSS module must be able to interwork with the NFV management module 108. As with the UI module 110, OSS/BSS 112 interworking is enabled through the use of APIs provided by the management subsystems 138, controllers 148 and other components within the management module 108.

Figure 2:
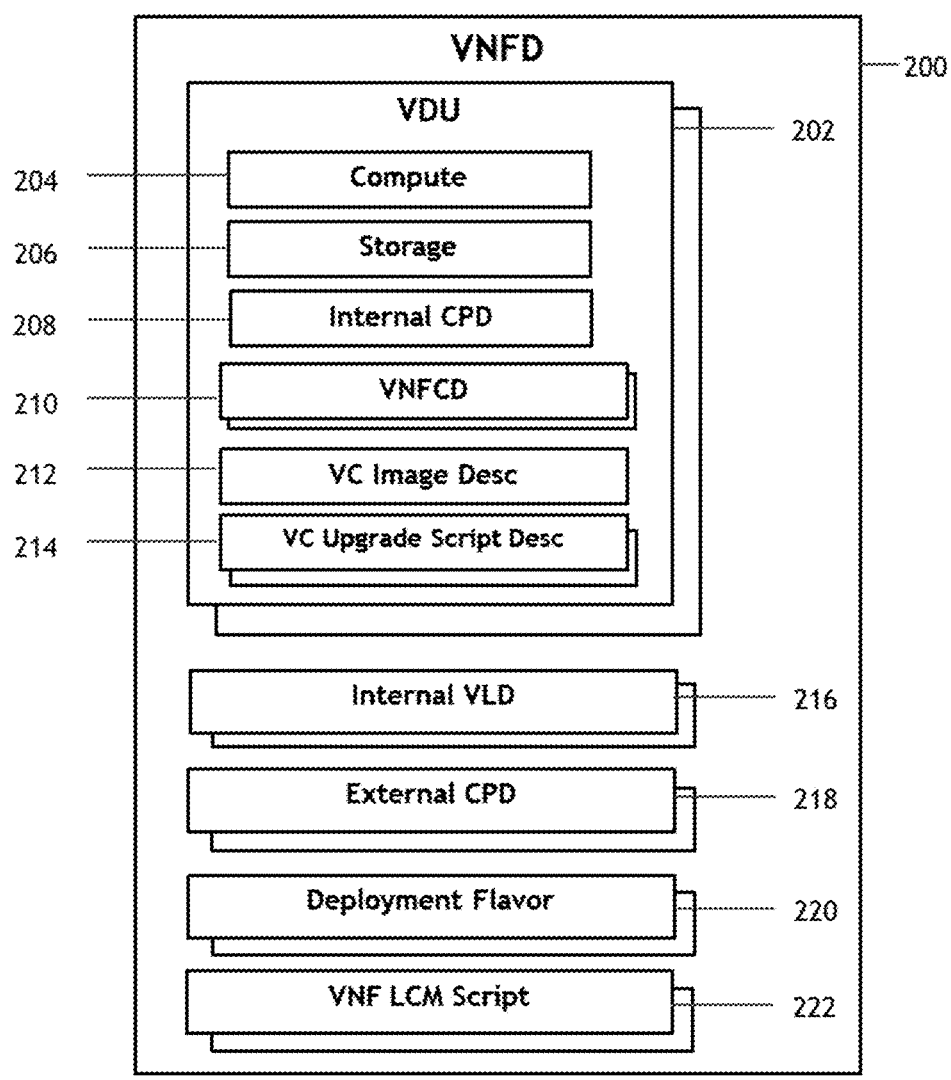
FIG. 2 is a diagram of an embodiment of a VNF descriptor in accordance with one or more embodiments.

FIG. 2 illustrates a VNF Descriptor (VNFD) 200 which defines the VNF properties and requirements for onboarding and management of a VNF in an NFV system 100 (See FIG. 1) in accordance with one or more embodiments of the present application. Each VNFD 200 includes VNF identification attributes including a globally unique id, a provider identifier, a product identifier and a software version. Additionally, a VNFD includes one or more Virtual Deployment Units (VDUs) 202. Each VDU 202 may include one or more VNFCs 118 (See FIG. 1). Given this, each VDU 202 specifies the Compute 204 and Storage 206 resource requirements for running the included VNFCs. Additionally, the VDU 202 includes internal network Connection Point Descriptors (CPD) 208 which describe requirements for networking ports to be used for VNFC 118 (See FIG. 1) to VNFC communication. In accordance with one or more embodiments of the present application, each VDU includes one or more VNFC Descriptors (VNFCDs) 210 that describe the VNFCs that execute inside the VC instantiated based on this VDU 202. Further, a VC image descriptor 212 is included in the VDU 202. This image descriptor includes a reference to the location of the VC image required to install the VC that hosts the VNFCs 116 (See FIG. 1) described by the VNFCDs 210. Typically, the location reference is internal to the VNF Package 114 (See FIG. 1), but the reference may also refer to an external source. Additionally, in some embodiments, the VDU contains one or more VC Upgrade Script Descriptors 214. These scripts, which enable upgrade of the non-VNFC components of the VC, may be included if the VNFCs 118 (See FIG. 1) defined by the VNFCDs 210 are independently upgradable from the VC that hosts them.

In addition to the VDUs 202, the VNFD 200 also includes internal Virtual Link Descriptors (VLD) 216 which describe the network connectivity requirements between VNFCs within a VNF. Additionally, the VNFD 200 includes external network Connection Point Descriptors (CPD) 218 which describe requirements networking ports to be used for VNF 116 (See FIG. 1) communication. Further, the VNFD 200 includes descriptions of deployment flavors 220 which define size bounded deployment configurations related to capacity. Additionally, the VNFD 200 may include one or more VNF LCM script descriptors 222. Each VNF LCM script descriptor 222 provides a reference to a lifecycle management script included in the VNF Package 114 (See FIG. 1).

Figure 3:
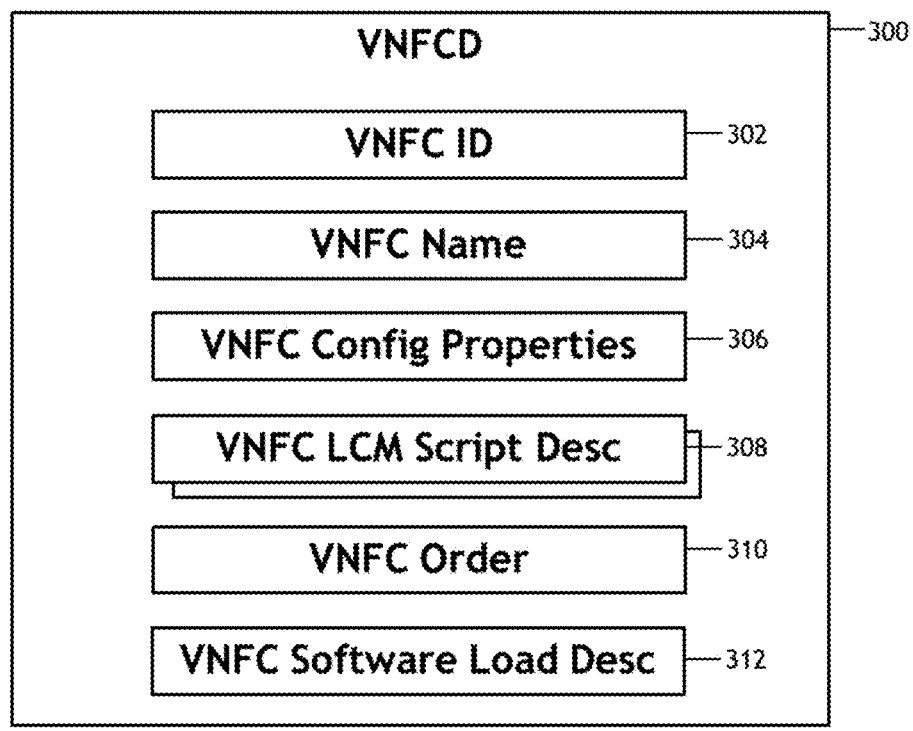
FIG. 3 is a diagram of an embodiment of a VNFC descriptor in accordance with one or more embodiments.

FIG. 3 illustrates a VNFC Descriptor 300 which describes a VNFC that makes up part of a VNF 116 (See FIG. 1) in accordance with one or more embodiments of the present application. The ID attribute 302 provides a unique identifier within the VNF for referencing a particular VNFC. In one embodiment this identifier 302 is used to specify a particular VNFC during a VNFC lifecycle management operation (start, stop kill, etc.). In another embodiment, this identifier 302 is used to determine the location of a VNFC-specific lifecycle management script within a VNF package 114 (See FIG. 1). Further, a VNFCD 300 may include a human readable VNFC name 304. Additionally, a VNFCD 300 may be include a set of configurable properties 306 of all VNFC instances based on this VNFCD 300. Further, a VNFC Descriptor 300 may include one or more VNFC specific lifecycle management script descriptors 308. Each LCM script descriptor 304 provides a reference to a VNFC lifecycle script included in the VNF Package 114 (See FIG. 1). Additionally, a VNFC Descriptor 300 may also include an order attribute 310. An order attribute may be used to control the start/stop order of the VNFCs during VNF lifecycle operations such as instantiate and upgrade. Further, a VNFC Descriptor 300 may also include a software load descriptor 312. A software load descriptor 312 provides a reference to a VNFC software load included in the VNF Package 114 (See FIG. 1).

Figure 4:
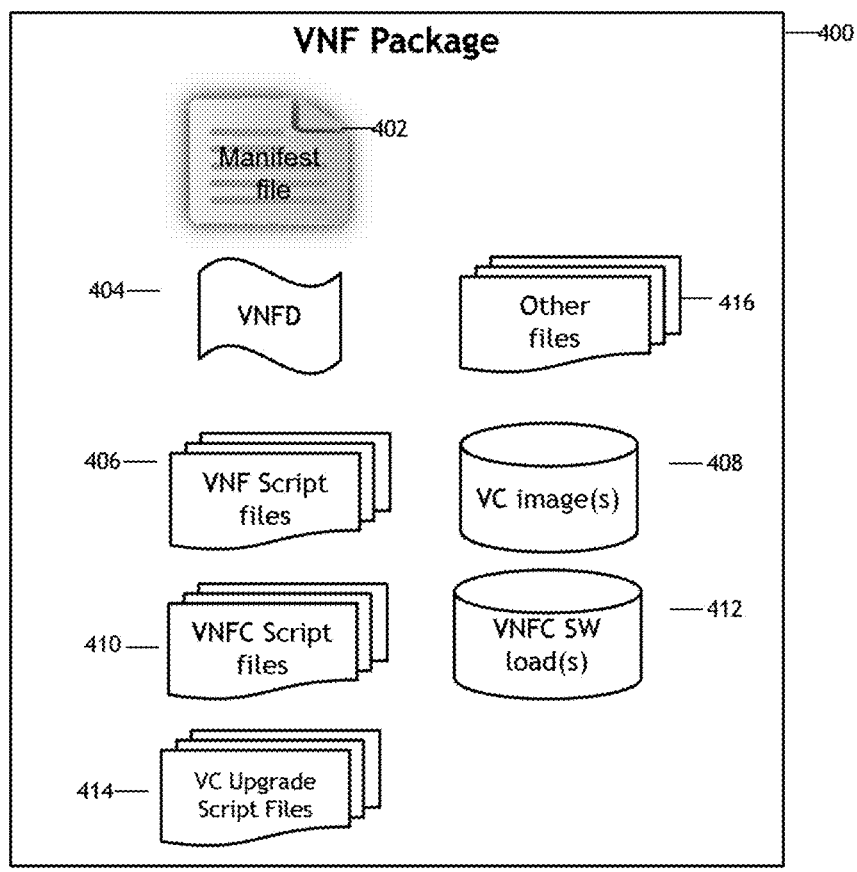
FIG. 4 is a diagram of an embodiment of a VNF package in accordance with one or more embodiments.

In accordance with one or more embodiments of the present application, FIG. 4 illustrates a VNF Package 400 which includes the requirements, configuration and software images required to onboard a VNF 116 (See FIG. 1) in an NFV system 100 (See FIG. 1). The VNF package is delivered by a VNF provider as a whole and is immutable. The package is digitally signed to protect it from modification. VNF Packages 400 are stored in an SDC Catalog 136 (See FIG. 1) in an NFV System 100 (See FIG. 1). Each package contains a manifest file 402 which specifies the list of contents it contains. Further, the package 400 contains a VNFD 404, which as described in FIG. 3, includes the metadata for VNF onboarding and lifecycle management. Additionally, any VNF specific lifecycle management (onboard, deploy, start, etc.) scripts 406 are included. The actual binary images for each VC (VDU) 408 are also supplied. In some embodiments, a VC binary image is fully populated with the installed software of one or more VNFCs. In other embodiments, a VC binary image is populated with everything but the software required for running the associated VNFCs. In accordance with one or more embodiments of the present application, the VNF package 400 may also contain any VNFC specific lifecycle script files 410 supplied by the VNF provider. Further, in accordance with one or more embodiments of the present application, the VNF package 400 may also contain any VNFC software loads 4102 supplied by the VNF provider. These VNFC software loads 412 are useful during upgrade scenarios, as it may be desirable to upgrade an individual VNFC instead of the entire VC. It should be noted that in some embodiments, the VNFC software loads 412 are also included in the VC image binary file 408 in order to ease and expedite initial deployment. Further, in accordance with one or more embodiments of the present application, the VNF package 400 may also contain VC upgrade scripts 414 supplied by the VNF provider. These VC upgrade scripts 414 enable VC changes which may be required in order to run a newer version of one or more VNFCs. Additionally, the VNF package may include other files 416, which may consists of, but are not limited to, test files, license files and change log files.

In accordance with one or more embodiments of the present application, FIG. 5 illustrates a VNF Package Archive 500 which is a compressed collection of the contents of a VNF Package 400 (See FIG. 4). In one embodiment, the Cloud Service Archive (CSAR) format is used for delivery of VNF packages 400 (See FIG. 4). A CSAR file is a zip file with a well-defined structure. In one embodiment the CSAR file structure conforms to a version of the Topology and Orchestration Specification for Cloud Application (TOSCA) standards. In one embodiment, the VNF package archive 500 conforms to a version of the TOSCA Simple Profile for NFV specification.

The exemplary VNF Package Archive 500 embodiment includes a VNFD specification file 502. In one embodiment, this file is expressed in Yet Another Modeling Language (YAML). The name of the file will reflect the VNF being delivered. Additionally, the package archive 500 may include a manifest file 504, which lists the entire contents of the archive. In one embodiment, the manifest 504 will also include a hash of each included file. Further, a signing certificate, including a VNF provider public key, may also be included 506 to enable verification of the signed artifacts in the archive 500. Additionally, a change log file 508 may be included that lists the changes between versions of the VNF. A licenses directory 510 may also be included that holds the license files 512 for all the applicable software component contained in the various software images 526. An artifacts directory 514 may be present to hold scripts and binary software images delivered in this package archive 500. Under the artifacts directory, a scripts directory 516 may be present to hold the VNF lifecycle management scripts 518.

In accordance with one or more embodiments of the present application, the archive 500 may include a hierarchical directory structure 520 for organization of all VDU artifacts under the artifacts directory 514. Under directory 520 may be a directory 522 for each specific VDU/VC. Under directory 522 may be a directory 524 for VDU/VC software image files 526. Further, under directory 522 may be a directory 528 for VDU/VC upgrade script files 530. Additionally, there may be a VNFC directory 532, which contains a directory for each specific VNFC 534 include in the VDU. In one embodiment, the name of directory 534 will match that of the ID field 302 (See FIG. 3) of the applicable VNFCD. Under each VNFC specific directory 534 may be a scripts directory 536 which contains lifecycle management script files 538 for the VNFC. Additionally, a software loads directory 540 may be present to hold VNFC software loads 542.

It should be understood that though a very hierarchical organization structure is depicted in this embodiment, other embodiments with flatter organization structures are equally applicable so long as the corresponding load and script descriptors in the VNFD 404 (See FIG. 4) reflect the correct location.

Figure 6:
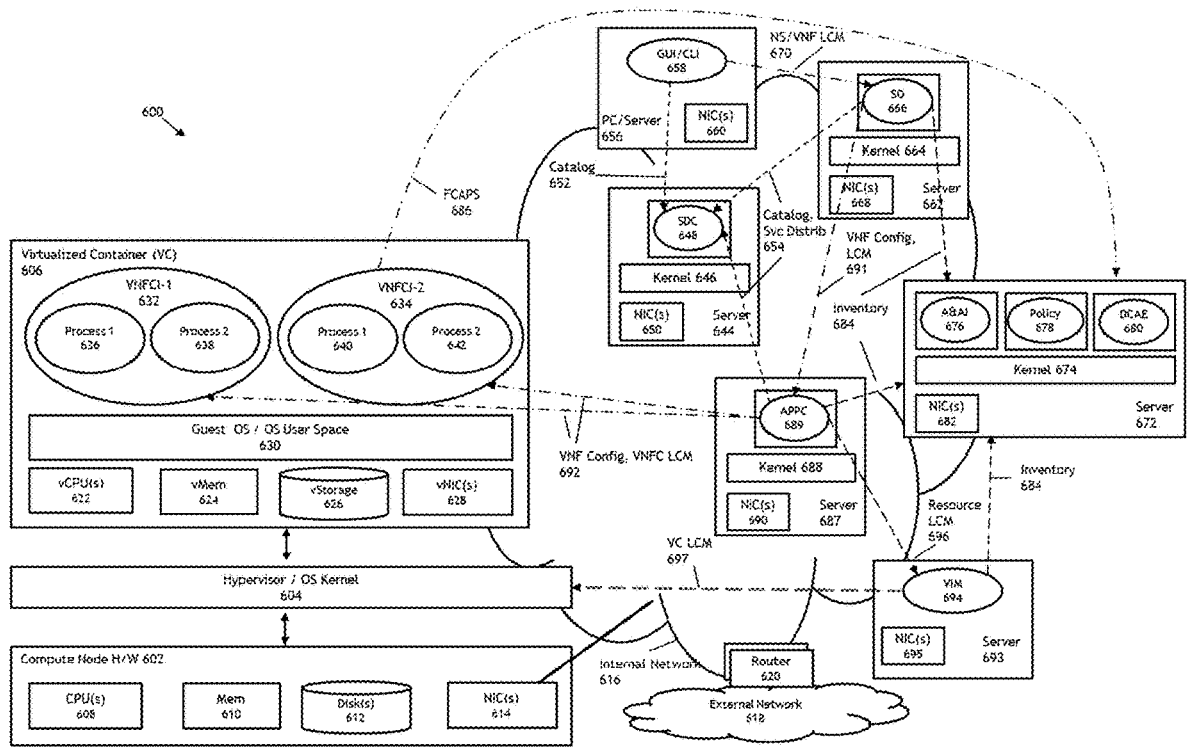
FIG. 6 is a diagram of an embodiment of a deployment of a VNF with multiple VNFCIs in a single Virtualized Container (VC).

FIG. 6 illustrates an NFV deployment 600 that includes a Virtualized Container (VC) hosting multiple VNFCs in accordance with one or more embodiments of the present application. The NFV system 600 is comprised of at least one physical compute node 602. In one embodiment, the compute node 602 hosts a hypervisor 604, which in turn manage one or more Virtual Machines (VMs) 606. In another embodiment, the compute node 602, hosts operating systems (OSs) 604 which manage one or more containers 606. Both embodiments provide virtualization environments in which the VNF Component Instances (VNFCI) 626 and 628 reside. As the virtualization environment provided by both embodiments is sufficient for execution, the two embodiments should be considered interchangeable herein, and are referenced by the term Virtualized Container (VC). In accordance with one or more embodiments of the present application, the VNFCIs 626 and 628 execute in VC 606.

Compute node 602 is comprised of a Central Processing Unit (CPU) module 608, a memory module 610, a disk module 612 and a network interface card (NIC) module 614. As further shown in FIG. 6, NIC 614 communicate network packets via a physical internal network 616, where in accordance with one or more preferred embodiments network 616 may be a private network. The internal network may be connected to an external physical network 618 via, for example, one or more network routers 620.

Each VC 606 is comprised of a series of virtual resources that map to a subset of the physical resources on the compute nodes 602. Each VC is assigned one or more virtual CPUs (vCPUs) 622, an amount of virtual memory (vMem) 624, an amount of virtual storage (vStorage) 626 and one or more virtual NICs (vNIC) 628. A vCPU 622 represents a portion or share of a physical CPU 608 that are assigned to a VM or container. A vMem 624 represents a portion of volatile memory (e.g. Random Access Memory) 610 dedicated to a VC. The storage provided by physical disks 612 are divided and assigned to VCs as needed in the form of vStorage 626. A vNIC 628 is a virtual NIC based on a physical NIC 614. Each vNIC is assigned a media access control (MAC) address which is used to route packets to an appropriate VC. A physical NIC 614 can host many vNICs 628.

In the case of a VM, a complete guest operating system 630 runs on top of the virtual resources 622-628. In the case of an operating system container, each container includes a separate operating system user space 630, but shares an underlying OS kernel 604. In either embodiment, typical user space operating system capabilities such as secure shell and service management are available.

One or more VNFC instances (VNFCIs) 632 and 634 may reside in VC 606. In accordance with one or more embodiments of the present application, the VNFCIs 632 and 634 are instances of different types of VNFCs. In some embodiments the VNFCIs 632-634 are composed of multiple operating system processes 636-642. In one embodiment each VNFCI 632 or 634 may be installed and managed as an operating system service. In another embodiment, a VNFCI 632 or 634 may be managed by a local NFV based software agent.

In accordance with one or more embodiments of the present application, a server 644, running a virtualization layer with a shared kernel 646, provides one or more VCs, at least one of which hosts an SDC 648. The server 644 has one or more NICs 650 which provide connectivity to an internal network 616 over which all incoming and outgoing messages travel. The Service Design and Creation (SDC) component 648 provides the platform for service modeling, creation, testing and distribution. The SDC module 648 provides APIs 652-654 which are usable by other components for querying VNF/service artifacts, uploading artifacts, and retrieving artifacts. Service and VNF artifacts are stored in an internal catalog 136 (See FIG. 1). In some embodiments, the contents of VNF package archives 500 (See FIG. 5) are extracted and stored in the catalog 136 (See FIG. 1) to expedite access from other modules. In some embodiments, VNF packages based on other standards such as Open Stack Heat may be on boarded. In such embodiments, artifacts may be transformed into a preferred internal format and stored in the SDC 648.

In some embodiments of the present application, a server or personal computer 656, hosts an GUI/CLI 658 which provides a user interface into the management module 108 (See FIG. 1) of an NFV system. The server/PC 656 has one or more NICs 660 which provide connectivity to an internal network 618 over which all incoming and outgoing messages travel. Service and VNF lifecycle management (LCM) operations, destined for the Service Orchestrator (SO) 666 may be initiated from the GUI/CLI 658.

In accordance with one or more embodiments of the present application, a server 662, running a virtualization layer with a shared kernel 664, provides one or more VCs, at least one of which hosts an SO 666. The server 662 has one or more NICs 668 which provide connectivity to an internal network 616 over which all incoming and outgoing messages travel. The SO 666 provides the execution of automated sequencing of activities, task, rules and policies needed for creation, modification, removal of network services or VNFs. Further, the SO 666 provides an API 670 which is usable by other components for network service and VNF lifecycle management. In some embodiments, the SO 666 maintains its own view of the SDC catalog using the Service Distribution Interface 654. In preferred embodiments, the SO 666 interworks with the A&AI 676, Policy 678 and DCAE 680 subsystems to provide system and VNF LCM.

In accordance with one or more embodiments of the present application, a server 672, running a virtualization layer with a shared kernel 674, provides one or more VCs, hosting one or more management subsystems, including but not limited to, an A&AI subsystem 676, a Policy subsystem 678, or a DCAE subsystem 680. The server 672 has one or more NICs 682 which provide connectivity to an internal network 616 over which all incoming and outgoing messages travel. The A&AI 676 maintains a live view of services and resources in the network, providing the state and relationship of the service components. Further it maintains the relationships between the management components (controllers, etc.) and the service components/resources being managed. The A&AI 676 provides an Inventory interface 684 which enables complex inventory queries that are needed by other components and subsystems. This interface 684 is utilized by the SO 666 to execute service and VNF LCM operations. The Policy subsystem 678 provides for the creation and management of modifiable configurations, rules assertions and/or conditions to provide real-time decision making on conditions and events that underlie the functions of the management module 108 (See FIG. 1). The Policy subsystem 678 provides a Policy query interface 684 which enables other components and subsystems. In some embodiments to find and utilize configured policies. In some embodiments, the SO 666 may query the Policy subsystem 678 for policies applicable to service and VNF LCM operations. The DCAE subsystem 680 gathers performance, usage and configuration data from the managed environment in order to enable FCAPS for the service, VNF and PNF components. Further, the DCAE 680 includes various analytics applications that operate on these data feeds to provide notifications of significant events or anomalies to other management components. The DCAE subsystem 680 provides a FCAPS 686 interfaces for the reporting of performance, usage, etc. data. This interface 686 is utilized by VNFCIs 632-634 to report the aforementioned data.

In accordance with one or more embodiments of the present application, a server 687, running a virtualization layer with a shared kernel 688, provides one or more VCs, at least one of which hosts an APPC 689. The server 687 has one or more NICs 690 which provide connectivity to an internal network 616 over which all incoming and outgoing messages travel. The APPC 689 supports VNF configuration and lifecycle management. Further it provides interfaces 691 for these functions that the SO 666 utilizes to instantiate, start, stop, etc. VNFs. The A&AI 676 may be consulted before executing these operations and updated during and after the operations complete. In one embodiment, the APPC 689 retrieves VNF package archives 500 (See FIG. 5) or package contents 502-542 (See FIG. 5) directly from an SDC 648 in order to instantiate a VNF. In another embodiment, the APPC 689 caches VNF package archives 500 (See FIG. 5) or package contents 502-542 (See FIG. 5) managed VNFs for efficient access. In a preferred embodiment, VNF LCM interface 691 provide additional commands for LCM of individual VNFCs 632-634. Further, once a VNF is instantiated, the APPC 689 may control, monitor, and update its configuration based on interfaces 692 that it is required to provide. As each VNF is comprised of one or more VNFCs 632-634, the configuration and monitoring interface is implemented on at least one of the VNFCs 632 or 634. Given this, the interfaces 692 are instantiated in one or more VNFCIs 626.

In one embodiment, a server 693 hosts a VIM 694 which is responsible for managing the virtualized infrastructure of the NFV System 600. The server 693 has one or more NICs 695 which provide connectivity to an internal network 616 over which all messages travel. There may be many VIMs 694 in a system 600. The VIM 694 provides resource management interfaces 696 which are utilized by the APPC 689. In a preferred embodiment, the VIM 694 extracts and caches VC images stored in VNF Packages archives 500 (See FIG. 5) in order expedite the deployment process. In order to fulfill a resource management request, a VIM 694 may need to manage a compute node 602, hypervisor/OS 604, VM 606, network 616 switch, router 620 or any other physical or logical element that is part of the NFV System 600 infrastructure. In one embodiment, a VIM 694 will query the states of requisite logical and physical elements when a resource management request is received from an APPC 689. This embodiment may not be efficient however given the elapsed time between state requests and responses. In another embodiment, a VIM 689 will keep a current view of the states of all physical and logical elements that it manages in order to enable efficient processing when element states are involved. Further, in some embodiments a VIM 689 updates the A&AI 676 about resource state changes using the Inventory interface 684 provided by the A&AI 676 and utilized by the SO 666 and APPC 689. In other embodiments, the APPC 689 interworks with a Multi-VM/Cloud adapter 156 (See FIG. 1), instead of directly with a VIM 689, to manage underlying infrastructure resources.

Figure 7:
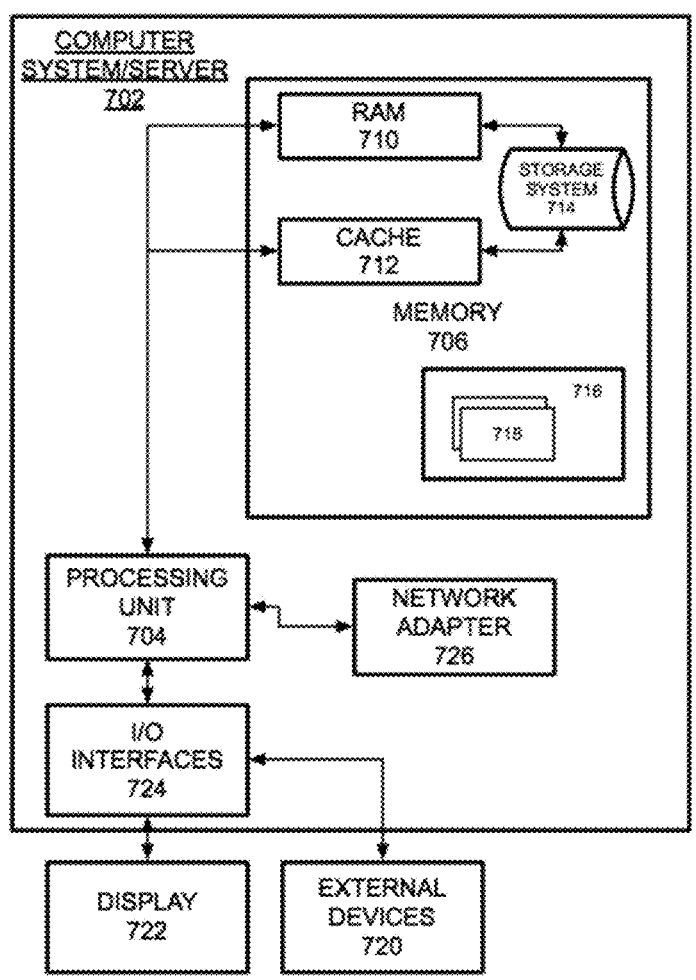
FIG. 7 is a diagram of an embodiment of a standard hardware diagram in accordance with one or more embodiments.

FIG. 7 illustrates one example of a computing node 700 to support one or more of the example embodiments. This is not intended to suggest any limitation as to the scope of use or functionality of the embodiments described herein. Regardless, the computing node 700 is capable of being implemented and/or performing any of the functionalities or embodiments set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and nonvolatile media, removable and non-removable media.

The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of various embodiments as described herein.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments as described herein.

Aspects of the various embodiments described herein may be embodied as a system, method, component or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

In general, the routines executed to implement the embodiments, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the embodiments. Moreover, while the embodiments have and herein will be described in the context of fully functioning computers and computer systems, the various embodiments are capable of being distributed as a program product in a variety of forms, and that the embodiments apply equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments. However, it should be appreciated that any particular program nomenclature used herein is merely for convenience, and thus the embodiments should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the embodiments are not limited to the specific organization and allocation of program functionality described herein.

The exemplary environment illustrated in FIG. 7 is not intended to limit the present embodiments. Indeed, other alternative hardware and/or software environments may be used without departing from the scope of the embodiments described herein.

Figure 8:
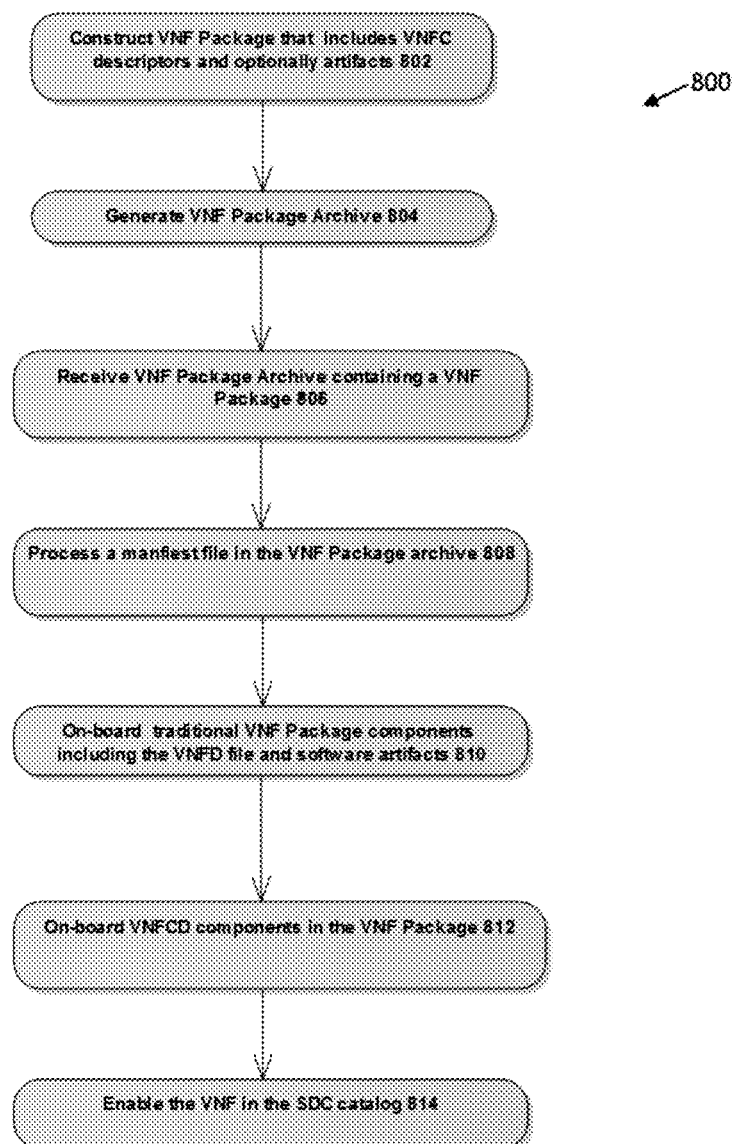
FIG. 8 is a diagram of an embodiment of a VNF onboarding flow chart in accordance with one or more embodiments.

In accordance with one or more embodiments of the present application, FIG. 8 illustrates a VNF onboarding process 800 for a VNF which include one or more VDUs composed of multiple VNFCs. A VNF provider constructs a VNF package 802 that includes at least one of a VNFD 200 (See FIG. 2) with one or more VNFC descriptors 300 (See FIG. 3) or one or more VNFC artifacts 410-412 (See FIG. 4). In one embodiment, the VNFD is constructed as described in FIG. 2. In some embodiments, the VNFC descriptors are constructed as described in FIG. 3. In one embodiment, the VNF Package includes one or more VNFC lifecycle management scripts 410 (See FIG. 4). In another embodiment, the VNF package includes one or more VNFC software loads 412 (See FIG. 4).

Once the VNF package 400 (See FIG. 4) has been constructed, the VNF provider generates an archive 804 that contains the contents in compliance with the requirements of the destination SDC 648 (See FIG. 6)/106 (See FIG. 1). In accordance with one or more embodiments of the present application, the archive may reflect the exemplary embodiment depicted in FIG. 5. In one embodiment, the archive may be in the Cloud Service Archive (CSAR) format.

In step 806, an SDC 648 (See FIG. 6) receives the VNF Package Archive 500 (See FIG. 5) from a VNF Provider which includes a VNF Package 400 (See FIG. 4). In one embodiment, the archive is received by a package management system included within the SDC 658 (See FIG. 6). Once the package archive is received by the SDC 648 (See FIG. 6), the manifest file 504 (See FIG. 5) is located and processed 808. If the manifest file is not found, then processing of the archive ceases. If it is found, then the signing certificate 506 (See FIG. 5) is processed. Additionally, the SDC 648 (See FIG. 6) may perform other security checks based on checksum, digest, etc. files contained in the archive against the trusted manifest file.

In step 810, the SDC 648 (See FIG. 6)/106 (See FIG. 1) on-boards the traditional VNF package components. The VNFD file 502 (See FIG. 5) is first located and extracted from the VNF Package Archive 500 (See FIG. 5). In one embodiment, the SDC may process the identification attributes in the VNFD file 502 (See FIG. 5), to see if the VNFD 200 (See FIG. 2) has been previously on-boarded into the SDC catalog 136 (See FIG. 1). If the VNF identifier plus version are identical to what is in the catalog, then the VNF Provider may be prompted to confirm whether or not to continue, as this will result in a VNF package overwrite. If a VNFD file 502 (See FIG. 5) under the same identification attributes is found, but the version is newer, then the SDC 648 (See FIG. 6) may process this as a package update instead of as a package addition. In accordance with one or more embodiments of the present application, the VNFD file 502 (See FIG. 5) may include one or more VNFC descriptors 212 (See FIG. 2).

Once the VNFD file 502 (See FIG. 5) is on-boarded, additional VNF package components 406-414 (See FIG. 4) are located and processed. In some embodiments, the SDC 648 (See FIG. 6) loads VNFC software images and/or lifecycle management scripts 406-408 (See FIG. 4). In one embodiment, these artifacts are extracted from the archive 500 (See FIG. 5) and stored along with the VNFD file in the SDC catalog 136 (See FIG. 1). In another embodiment, one or more of these artifacts may be stored in another database, and an external reference is added to the VNF entry in the SDC catalog 136 (See FIG. 1). In some cases, the VC software image reference 210 (See FIG. 2) may specify an external source. In such an embodiment, the software image may be uploaded from the source and stored in the SDC catalog 136 (See FIG. 1) for efficient, localized access.

In step 812, and in accordance with one or more embodiments of the present application, VNFC artifacts are located and processed. In some embodiments, the SDC 648 (See FIG. 6) loads VNFC software loads and/or lifecycle management scripts 410-412 (See FIG. 4). In one embodiment, these artifacts are extracted from the archive 500 (See FIG. 5) and stored along with the VNFD file in the SDC catalog 136 (See FIG. 1). In another embodiment, one or more of these artifacts may be stored in another database, and an external reference is added to the VNF entry in the SDC catalog 142 (See FIG. 1). In some cases, the VNFC software load reference 312 (See FIG. 3) may specify an external source. In such an embodiment, the software load may be uploaded from the source and stored in the SDC catalog 136 (See FIG. 1) for efficient, localized access.

In step 814, the VNFD in enabled in the SDC catalog 136 (See FIG. 1). In some embodiments, the SDC 648 (See FIG. 6)/106 (See FIG. 1) automatically enables the VNFD once the on-boarding process has completed.

What is claimed is:

1. A method for on-boarding a Virtual Network Function (VNF) comprising a Virtual Deployment Unit (VDU) containing a plurality of Virtual Network Function Components (VNFCs), the method comprising:
receiving, by a hardware-implemented server executing a Service Design and Creation (SDC) module, an archive, created by a VNF provider, the archive containing contents of a VNF package including a VNF Descriptor (VNFD) file containing the Virtual Deployment Unit (VDU), where the VDU further includes a plurality of VNFC descriptor files each corresponding to one of the plurality of VNFCs, and where the archive contains VNFC artifacts;
identifying, by the SDC module, a manifest file in the archive, the manifest file listing an entire contents of the archive;
on-boarding, by the SDC module, the VNFD file;
on-boarding, by the SDC module, the VDU; and
enabling, by the SDC module, the VNF in a catalog of the SDC module comprising automatically enabling the VNF in the catalog of the SDC module based on a completion of the on-boarding process.

2. The method of claim 1, wherein the VNFC artifacts comprise:
a VNF specific lifecycle management (LCM) script file;
a VNFC specific lifecycle script file;
a Virtualized Container (VC) upgrade scrip file;
a VC image binary file; and
a VNFC software load.

3. The method of claim 1, comprising:
processing, by the SDC module, a signing certificate located in the archive based on the identifying the manifest file.

4. The method of claim 1, further comprising:
storing, by the SDC module, the VNFD file in the catalog of the SDC module.

5. The method of claim 1, further comprising:
storing, by the SDC module, the VNFD file in a remote database specified in a VC image descriptor file of the VNFD.

6. The method of claim 1, wherein the archive further includes:
a VNFC directory that contains a separate directory for each VNFC of the plurality of VNFCs.

7. An apparatus for on-boarding a Virtual Network Function (VNF) comprising a Virtual Deployment Unit (VDU) containing a plurality of Virtual Network Function Components (VNFCs), the apparatus comprising:
a hardware-implemented server executing a Service Design and Creation (SDC) module configured to:
receive an archive, created by a VNF provider, containing contents of a VNF package including a VNF Descriptor (VNFD) file containing the Virtual Deployment Unit (VDU), where the VDU further includes a plurality of VNFC descriptor files each corresponding to one of the plurality of VNFCs, and where the archive contains VNFC artifacts;
Identify a manifest file in the archive, the manifest file listing an entire contents of the archive;
on-board the VNFD file;
on-board the VDU;
enable the VNF in a catalog of the SDC module; and
store the VNFD file in a remote database specified in a VC image descriptor file of the VNFD.

8. The system of claim 7, wherein the VNFC software element artifacts comprise:
a VNF specific lifecycle management (LCM) script file;
a VNFC specific lifecycle script file;
a Virtualized Container (VC) upgrade scrip file;
a VC image binary file; and
a VNFC software load.

9. The system of claim 7, wherein the SDC module is further configured to:
process a signing certificate located in the archive based on the identification of the manifest file.

10. The system of claim 7, wherein the SDC module is further configured to:

store the VNFD file in the catalog of the SDC module.

11. The system of claim 7, wherein, when the SDC module enables the VNF, the SDC module is further configured to:
automatically enable the VNF in the catalog of the SDC module based on a completion of the on-boarding process.

12. The system of claim 7, wherein the archive further includes:
a VNFC directory that contains a separate directory for each VNFC of the plurality of VNFCs.

13. A non-transitory computer readable medium storing instructions for on-boarding a Virtual Network Function (VNF) comprising a Virtual Deployment Unit (VDU) containing a plurality of Virtual Network Function Components (VNFCs) that when read by a processor of a hardware-implemented server executing a Service Design and Creation (SDC) module cause the processor to:
receive an archive, created by a VNF provider, containing contents of a VNF package including a VNF Descriptor (VNFD) file containing the Virtual Deployment Unit (VDU), where the VDU further includes a plurality of VNFC descriptor files each corresponding to one of the plurality of VNFCs, where the archive contains VNFC artifacts, a VNFC directory that contains a separate directory for each VNFC of the plurality of VNFCs and where the archive contains a VNFC directory that contains a separate directory for each VNFC of the plurality of VNFCs;
identify a manifest file in the archive, the manifest file listing an entire contents of the archive;
on-board the VNFD file;
on-boarding the VDU; and
enable the VNF in a catalog of the SDC module.

14. The non-transitory computer readable medium of claim 13, wherein the VNFC software element artifacts comprise:
a VNF specific lifecycle management (LCM) script file;
a VNFC specific lifecycle script file;
a Virtualized Container (VC) upgrade scrip file;
a VC image binary file; and
a VNFC software load.

15. The non-transitory computer readable medium of claim 13, wherein the instruction further cause to processor to:
process a signing certificate located in the archive based on the identifying the manifest file.

16. The non-transitory computer readable medium of claim 13, wherein the instruction further cause to processor to:
store the VNFD file in the catalog of the SDC module.

17. The non-transitory computer readable medium of claim 13, wherein the instruction further cause to processor to:
store the VNFD file in a remote database specified in a VC image descriptor file of the VNFD.

* * * * *